June 15, 1954 P. C. GOLDMARK ET AL 2,681,388

PHONOGRAPH PICKUP

Filed March 3, 1949 3 Sheets-Sheet 1

INVENTORS
PETER C. GOLDMARK
RENÉ SNEPVANGERS
BY Pennie, Edmonds, Morton and Barrows
ATTORNEYS June 15, 1954 P. C. GOLDMARK ET AL 2,681,388
PHONOGRAPH PICKUP
Filed March 3, 1949 3 Sheets-Sheet 2
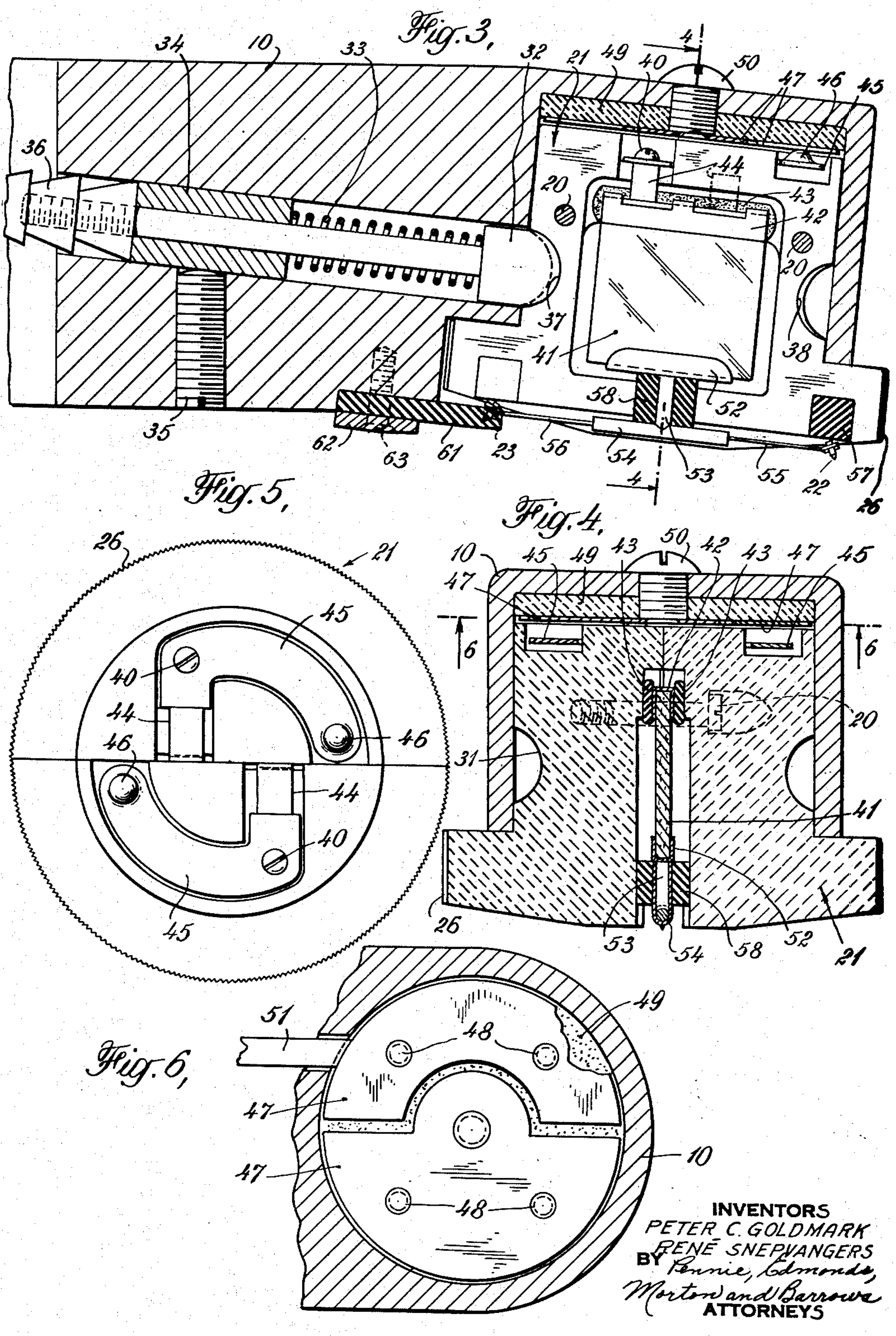
Fig. 3, Fig. 4, Fig. 5, Fig. 6,
INVENTORS
PETER C. GOLDMARK
RENÉ SNEPVANGERS
BY Pennie, Edmonds, Morton and Barrows
ATTORNEYS June 15, 1954 P. C. GOLDMARK ET AL 2,681,388

PHONOGRAPH PICKUP

Filed March 3, 1949 3 Sheets-Sheet 3

INVENTORS
PETER C. GOLDMARK
RENÉ SNEPVANGERS
BY
Pennie, Edmonds, Morton and Barrows
ATTORNEYS Patented June 15, 1954

2,681,388

UNITED STATES PATENT OFFICE 2,681,388

PHONOGRAPH PICKUP

Peter C. Goldmark, New Canaan, Conn., and René Snepvangers, New York, N. Y., assignors to Columbia Broadcasting System, Inc., New York, N. Y., a corporation of New York Application March 3, 1949, Serial No. 79,332

13 Claims. (Cl. 179—100.41)

This invention relates to phonograph reproducer arms for alteratively reproducing fine and coarse groove phonograph records with a single pickup cartridge.

The standard phonograph record disk which has been available to the public for many years is a sound record disk rotating at 78 R. P. M. and having a sound groove spiral of the order of 100 convolutions per inch. The groove is laterally modulated in accordance with the sound to be reproduced and the maximum amplitude of excursion is approximately 0.002 inch. The tip radius of the stylus employed for reproducing these records is usually about 0.003 inch. The pickup arm weights commonly give a vertical force at the stylus of 30 grams or more, although in a few instances somewhat lighter arms have been used. The records are usually available in 10- and 12-inch sizes, the latter yielding a maximum playing time of approximately 4 minutes and 20 seconds on one side.

There have recently been made available fine-groove long-playing record disks having more than 200 grooves per inch and rotating at 33⅓ R. P. M. With a 12-inch diameter, such records yield maximum playing times in excess of 20 minutes per side. The maximum amplitude of excursion of the lateral modulation is of the order of 0.0009 inch. Due to the fine groove, the tip radius of the stylus is much smaller than for the previous standard record, and is approximately 0.001 inch. Very light stylus weights are employed, of the order of 6 grams.

Inasmuch as many millions of 78 R. P. M. standard records are now in the hands of the public, it is highly desirable to provide a reproducer arm which is capable of reproducing either the standard coarse-groove records or the newer fine-groove records alternatively. The difference in fineness of grooves requires styli of different tip radii. Separate cartridges could be employed, each designed for the reproduction of one type of record only. These could be used with separate arms yielding different stylus weights. Such duplication adds expense and increases the space required for mounting.

The present invention is directed to the provision of a pickup cartridge adapted for use in a single pickup arm and having two styli whose tip radii are appropriate to the two types of records. In order to avoid the necessity for changing the weight of the pickup arm when employing different styli, the cartridge is so designed that both standard, coarse-groove and long-playing, fine-groove records may be played with a very light stylus pressure. With such light stylus pressures, the needle point compliance must be carefully correlated with the other characteristics of the arm so as to provide proper tracking during reproduction, and avoid any danger of jumping grooves. It is also desirable that the output of the pickup cartridge be approximately the same when playing either type record so that the over-all amplification need not be changed when going from one record to another.

In accordance with one feature of the present invention, different compliances are employed in the suspensions of the two styli, the compliance for the coarse-groove record being greater than for the fine-groove. The higher compliance permits the stylus to follow the greater amplitudes of excursion of the coarse-groove records while maintaining proper tracking, and also tends to equalize the responses for the two types of records. It is highly desirable to employ cantilever suspensions for the styli so as to permit proper vertical and lateral compliance to be obtained. Preferably two approximately horizontal cantilever arms are employed which extend in opposite directions from a stylus mounting attached to a transducer for converting mechanical movement into an electrical signal. Advantageously, a piezoelectric crystal is employed which is secured at the top and has the double stylus mounting attached to the bottom so as to convert lateral movement of the styli into electrical signals.

In order to further equalize the outputs of the two styli when engaging respective records, a resilient damping element may be affixed to the pickup cartridge in position to be engaged by the top of the larger stylus when in playing position. This also serves to smooth the response for the coarser groove records.

With the double cantilever arm suspension which is preferred, it is found that peaks in the response characteristic occur at certain frequencies due to the presence of the arm not in use. In order to remove these spurious response peaks, a resilient damping pad is affixed to the arm in position to be engaged by the stylus not in use. This damping pad prevents vibration of the unused stylus and hence prevents it from affecting the response characteristic of the stylus in use.

In using the reproducing arm of the invention, the pickup cartridge is rotated as a unit to bring the proper stylus into playing position. This movement results in the engagement of the unused stylus with the damping pad affixed to the arm. When it is desired to play a record of the other type, the cartridge is simply rotated to bring the other stylus into playing position. Suitable provision should of course be made to change the turntable speed for the two types of records.

The invention will be more clearly understood by reference to the following detailed description of specific embodiments thereof, taken in conjunction with the drawings in which:

Fig. 3 is a sectional detail of the end of the pickup arm and the pickup cartridge, one half of the cartridge shell being considered removed;

Fig. 4 is a sectional detail taken along the line 4—4 of Fig. 3;

Fig. 5 is a plan view of the cartridge alone, showing the contacts thereof;

Fig. 6 is a section taken along the line 6—6 of Fig. 4, showing the contact plates mounted on the arm;

Figures 1, 2:
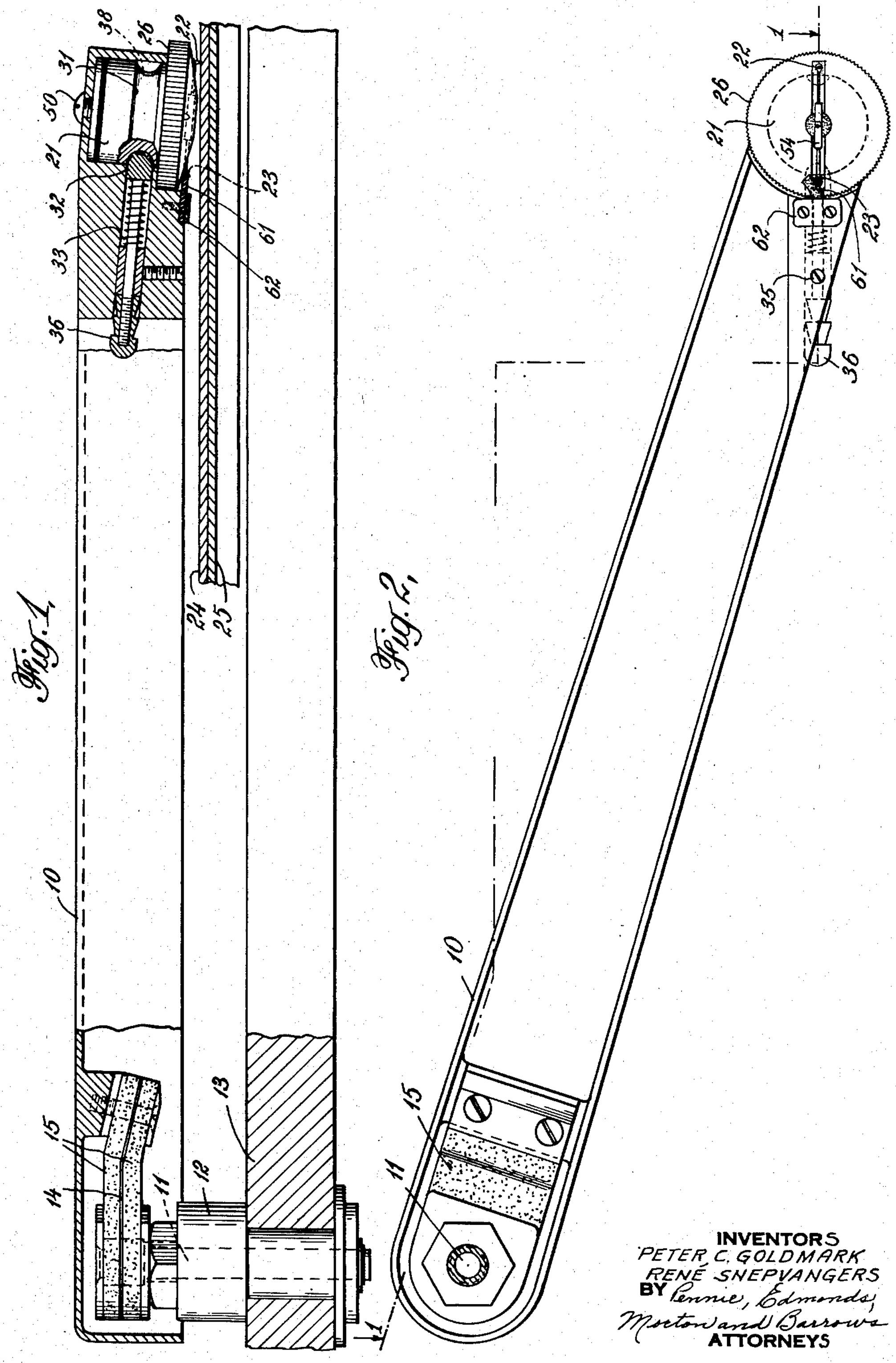
Fig. 1 is a sectional elevation of a pickup arm with a double stylus cartridge, taken along the line 1—1 of Fig. 2.
Fig. 2 is a view of the underside of the arm of Fig. 1.

Referring to Figs. 1 and 2, a pickup arm 10 is provided with spindle 11 rotating in a vertical bearing 12 mounted on a base plate 13. The arm 10 is attached to spindle 11 by means of a leaf spring 14 sandwiched between sheets of resilient damping material 15. When the pickup engages a record, spring 14 provides an upward force which partially counteracts the weight of the arm and yields the desired light stylus force. The details of the mounting are given in the copending application of Peter C. Goldmark, Serial No. 30,024 and need not be described in detail here. Other suitable forms of mounting may be employed if desired.

A pickup cartridge 21 is mounted at the end of arm 10 and arranged for rotation about an approximately vertical axis. The cartridge is provided with two styli 22 and 23 for coarse and fine groove records, respectively. Stylus 22 is shown in playing position on a disk record 24 carried by turntable 25. The cartridge may be rotated manually by means of the knurled surface 26.

Details of the cartridge and the manner of mounting it in the arm are shown in Figs. 3–6. The cartridge is provided with an annular groove 31, and is engaged by plunger 32 so as to retain the cartridge in position. Spring 33 presses the plunger into engagement with the cartridge. The spring is held under compression by means of bushing 34 secured in position by set screw 35. A knob 36 threaded onto the end of plunger 32 facilitates the initial adjustment of the compression in the spring. At diametrically opposite points on cartridge 21, the annular groove 31 is deepened to form sockets 37, 38 which provide two operating positions of the cartridge. The cartridge may readily be rotated from one position to the other by means of the knurled surface 26, and plunger 32 holds the cartridge in either position selected. It is convenient to form the cartridge shell in two halves held together by bolts 20.

The piezoelectric crystal 41 is secured in the cartridge by means of a metal U-shaped cap 42 which slips over the top edge of the crystal and is held in place by resilient strips 43 of rubber or other suitable material. Suitable terminal strips 44 are attached to the crystal so that an electromotive force may be developed between them. The strips terminate in contacts 45 (Fig. 5). These contacts are advantageously arcuate strips of spring material fastened to the cartridge by screws 40 and provided with protruding buttons 46 which engage corresponding contact plates 47 (Fig. 6) attached by rivets 48 to an insulating plate 49 (Fig. 3). The contact and insulating plates are secured at the end of the pickup arm by screw 50. Suitable leads (not shown) may be connected to contact plates 47 through screw 50 and tab 51.

An armature 52 is secured to the bottom edge of the crystal and has a short shaft 53 terminating in a sleeve 54. Cantilever arms 55 and 56 are mounted in sleeve 54, and styli 22 and 23 are affixed to the free ends of respective arms. The elements 52, 53 and 54 serve as a stylus mounting for conveying movement of the styli to the crystal. The cantilever arms extend approximately horizontally and provide both vertical and lateral compliance for respective styli. A bushing 58 of resilient material such as rubber surrounds shaft 53 and resiliently holds the armature in position in the cartridge.

It is advantageous to make the cantilever arms 55 and 56 with different lateral compliance. Stylus 22 which is adapted to play coarse-groove records is affixed to the end of the cantilever arm of higher lateral compliance. Stylus 23 for fine-groove records is affixed to the end of the cantilever arm of lower lateral compliance. The difference in compliance can readily be obtained by using piano wire of different diameter for the two arms. As explained before, the coarser groove records have a larger amplitude of excursion for a given recording level, and the increased compliance of the corresponding stylus arm equalizes the weight required for proper tracking and also equalizes the response with that of the stylus for fine-groove records. This is important inasmuch as a single transducer unit, in the form of the piezoelectric crystal 41, is employed.

It is possible to calculate the ratio of compliances which will approximately equalize the downward forces required to provide proper tracking stability for the two styli. The groove angle of both fine and coarse groove records is approximately 90°, so that the lateral force $F_s$ which overcomes the stiffness of the stylus suspension and tends to force the stylus out of the groove is approximately equal to $F_v$, the downward force at the stylus tip. This is the most important force at low frequencies, where most tracking problems are encountered. The force $F_s$ is related to the maximum stylus displacement or amplitude of excursion $D_{max}$ and to the compliance C measured at the stylus tip by the following equation:

$$F_s=\frac{D_{max}}{C}$$

Since $F_s$ is approximately equal to $F_v$:

$$F_v=\frac{D_{max}}{C}$$

Since $D_{max}$ for standard 78 R. P. M. records is slightly over twice that of the fine-groove records, the optimum ratio of compliances is slightly over two. In practice a margin of safety is usually allowed, that is, the stylus force is made somewhat greater than is theoretically required. Due to the margin of safety the ratio of the compliances may often be made less than two with satisfactory results. Nevertheless, it is usually desirable to make the compliance for the larger stylus substantially greater than that for the smaller stylus so as to reduce the difference in the weights required for proper tracking.

Because of the difference in compliances, the larger stylus exerts less torque on crystal 41 than the smaller stylus, for the same amplitude of excursion. As mentioned before, the coarse-groove records are recorded at a higher level than the fine-groove records, that is, a given volume level in the sound to be recorded results in a greater amplitude of excursion in the coarse groove than in the fine groove. Due to the difference in compliances, the differences in signal output of the crystal for the two types of records are reduced, and may be approximately equalized.

In order to further smooth the response of the unit for coarse-groove records, resilient damping material 57, for example, rubber or other suitable material is inserted in cartridge 21 above stylus 22. When the stylus is in playing position, the weight of the pickup arm causes the upper end of stylus 22 to engage member 57. Thus additional damping is provided which further equalizes the response with that of stylus 23 and provides a smooth frequency characteristic. If desired, the arm 55 may be oriented so that stylus 22 touches block 57 even when the stylus is not in engagement with a record.

In Fig. 3 stylus 22 is shown in playing position and stylus 23 is not in use. As explained before, if stylus 23 and cantilever arm 56 were left free to vibrate, the oscillations set up therein would result in spurious peaks in the frequency response characteristic of stylus 22. To prevent this, a resilient damping pad 61, in the form of a bumper of rubber or other suitable material, is affixed to arm 10 by means of clamping plate 62 and bolt 63. The end of damping pad 61 is located so as to be engaged by the stylus not in use. As shown in Fig. 3, the member 61 is engaged by stylus 23. The contact between the two may be quite light, since it is only necessary to damp out the spurious oscillations.

In the embodiment of Fig. 3, the overlap of pad 61 and stylus 23 is sufficiently small, and the resiliency of pad 61 sufficiently high, so that the cartridge may be rotated from one position to the other without damaging the stylus suspension. If desired, a positive stop could be provided to limit rotation of the cartridge to a 180° arc.

Figure 7:
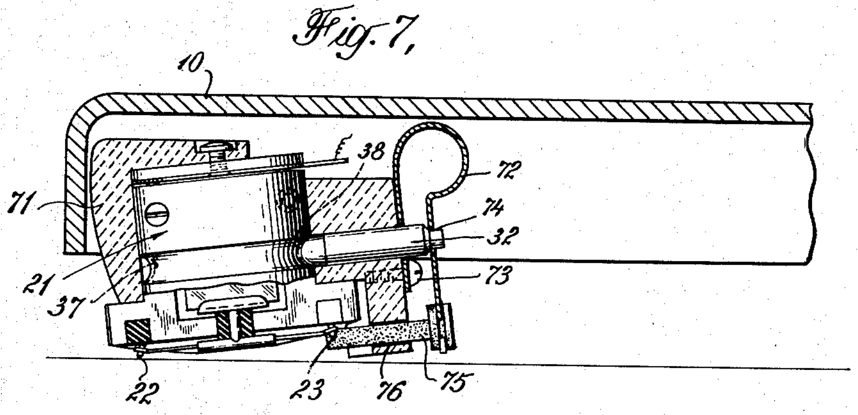
Fig. 7 is an elevation, partly in cross section, showing an alternative form of mounting for the pickup cartridge.
Figure 8:
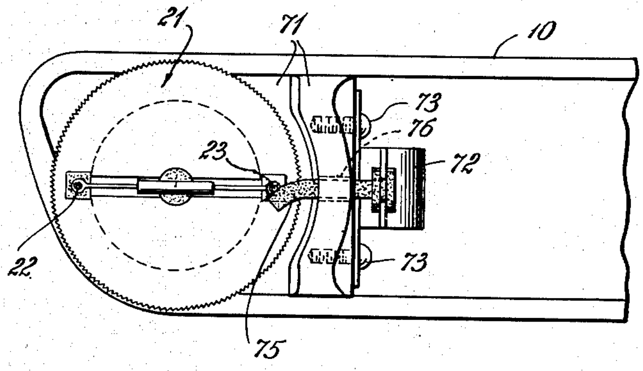
Fig. 8 is a bottom view of the modification of Fig. 7.
Figure 9:
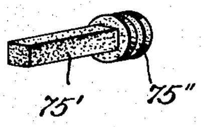
Fig. 9 shows the resilient damping pad used in the embodiment of Fig. 7.

In Figs. 7 and 8 and embodiment is shown in which a different arrangement is employed to support the plunger and damping pad. The pickups cartridge 21 is the same as before and need not be described again. It is mounted for rotation in a block 71 integral with arm 10. Spring 72 is secured to block 71 by the bolts 73. Plunger 32 is affixed at 74 to the spring, and the latter holds the plunger in engagement with the pickup cartridge. The resilient damping pad 75, functioning in the same manner as 61 of Fig. 3, is secured to the lower end of spring 72. As seen in Fig. 9, the damping pad is composed of an elongated portion 75' terminating in a grommet connection 75''. This grommet connection fits into a hole in the spring. The elongated portion 75' moves freely in a suitably shaped hole

76 in block 71. The length of pad 75 is selected so that when the plunger 32 is seated in one of the sockets 37, 38, the pad bears against and somewhat overlaps stylus 23 which is not in use, so as to damp vibration thereof.

Although specifically described in connection with a crystal-type pickup cartridge, it will be understood that the features of the invention may be employed with magnetic type cartridges also. It will be obvious to those skilled in the art that many variations in the details of the specific embodiments described are possible within the spirit and scope of the invention.

We claim:

1. In a phonograph reproducer arm assembly for reproducing fine-groove 33⅓ R. P. M. disk records having more than 200 grooves per inch and, alternatively, coarser groove 78 R. P. M. disk records having of the order of 100 grooves per inch, the amplitude of excursion of the coarser groove being at a higher level than that of the fine groove, the combination which comprises a pickup cartridge rotatably mounted about an approximately vertical axis in said arm and adapted to engage a record surface, said pickup cartridge comprising a transducer for converting mechanical movement into an electrical signal, a stylus mounting attached to said transducer and having a pair of approximately horizontally disposed cantilever arms of different lateral compliance extending in opposite directions from said mounting, a stylus of small tip radius adapted to engage said fine-groove records attached to the free end of the cantilever arm of lower compliance, and a stylus of larger tip radius adapted to engage said coarser groove records attached to the free end of said cantilever arm of higher compliance, whereby differences in the outputs of said transducer and the required tracking forces for fine and coarser groove records may be reduced.

2. In a phonograph reproducer arm assembly for reproducing laterally-modulated fine-groove 33⅓ R. P. M. disk records having more than 200 grooves per inch and, alternatively, laterally-modulated coarser groove 78 R. P. M. disk records having of the order of 100 grooves per inch, the amplitude of excursion of the coarser groove being at a higher level than the fine groove, the combination which comprises a pickup cartridge rotatably mounted about an approximately vertical axis in said arm and adapted to engage a record surface, said pickup cartridge comprising a piezoelectric crystal secured in said cartridge at the top end thereof and having a stylus mounting at the bottom end thereof, a pair of approximately horizontally disposed cantilever arms extending in opposite directions from said mounting, a stylus of small tip radius adapted to engage said fine-groove records attached to the free end of one cantilever arm, the other cantilever arm having higher lateral compliance than said one arm and having attached at the free end thereof a stylus of larger tip radius adapted to engage said coarser groove records, whereby the difference in the output of said crystal and in the tracking force required for fine and coarse groove records may be reduced.

3. In a phonograph reproducer arm assembly for alternatively reproducing fine-groove and coarser groove records, the combination which comprises a pickup cartridge rotatably mounted in said arm and adapted to engage a record surface, said pickup cartridge comprising a transducer for converting mechanical movement into an electrical signal, a stylus mounting attached to said transducer and having a pair of angularly spaced approximately horizontally disposed cantilever arms, a pair of styli disposed at the free ends of said cantilever arms respectively, said styli having different tip radii for engagement with fine and coarser groove records respectively, and resilient damping material attached to said cartridge above the stylus of larger tip radius in position to be engaged by the top of said stylus when reproducing a record.

4. In a phonograph reproducer arm assembly for alternatively reproducing fine-groove and coarser groove records, the amplitude of excursion of the coarser groove being at a higher level than that of the fine groove, the combination which comprises a pickup cartridge rotatably mounted in said arm and adapted to engage a record surface, said pickup cartridge comprising a transducer for converting mechanical movement into an electrical signal, a stylus mounting attached to said transducer and having a pair of angularly spaced approximately horizontally disposed cantilever arms of different lateral compliance, a stylus of small tip radius adapted to engage said fine-groove records attached to the free end of the cantilever arm of lower compliance, a stylus of larger tip radius adapted to engage said coarser groove records attached to the free end of said cantilever arm of higher compliance, and resilient damping material attached to said cartridge above the stylus of larger tip radius in position to be engaged by the top of said stylus when reproducing a record.

5. In a phonograph reproducer arm assembly for reproducing fine-groove 33⅓ R. P. M. disk records having more than 200 grooves per inch and, alternatively, coarser groove 78 R. P. M. disk records having of the order of 100 grooves per inch, the amplitude of excursion of the coarser groove being at a higher level than that of the fine groove, the combination which comprises a pickup cartridge rotatably mounted about an approximately vertical axis in said arm and adapted to engage a record surface, said pickup cartridge comprising a transducer for converting mechanical movement into an electrical signal, a stylus mounting attached to said transducer and having a pair of approximately horizontally disposed cantilever arms of different lateral compliance extending in opposite directions from said mounting, a stylus of small tip radius adapted to engage said fine-groove records attached to the free end of the cantilever arm of lower compliance, a stylus of larger tip radius adapted to engage said coarser groove records attached to the free end of said cantilever arm of higher compliance, and resilient damping material attached to said cartridge above the stylus of larger tip radius in position to be engaged by the top of said stylus when reproducing a record, whereby differences in the outputs of said transducer and the required tracking forces for fine and coarser groove records may be reduced.

6. In a phonograph reproducer arm assembly for alternatively reproducing fine-groove and coarser groove records, a pickup cartridge rotatably mounted in said arm and adapted to engage a record surface, said pickup cartridge comprising a transducer for converting mechanical movement into an electrical signal, a stylus mounting attached to said transducer and having a pair of angularly spaced cantilever arms, a pair of styli disposed at the free ends of said cantilever arms respectively, said styli having different tip radii for engagement with fine and coarser groove records respectively, and a resilient damping member affixed to said arm in position to be engaged by the free end of the cantilever arm bearing one stylus when the other is in playing position.

7. In a phonograph reproducer arm assembly for alternatively reproducing fine-groove and coarser groove records, a pickup cartridge rotatably mounted about an approximately vertical axis in said arm and adapted to engage a record surface, said pickup cartridge comprising a transducer for converting mechanical movement into an electrical signal, a stylus mounting attached to said transducer and having a pair of approximately horizontally disposed cantilever arms extending in opposite directions from said mounting, a pair of styli disposed at the free ends of said cantilever arms respectively, said styli having different tip radii for engagemet with fine and coarser groove records respectively, and a resilient damping member affixed to said arm in position to be engaged by the free end of the cantilever arm bearing one stylus when the other is in playing position to damp vibration of the stylus not in use.

8. In a phonograph reproducer arm assembly for alternatively reproducing fine-groove and coarser groove laterally modulated disk records, the amplitude of excursion of the coarser groove being at a higher level than that of the fine groove, a pickup cartridge rotatably mounted in said arm and adapted to engage a record surface, said pickup cartridge comprising a transducer for converting mechanical movement into an electrical signal, a stylus mounting attached to said transducer and having a pair of angularly spaced approximately horizontally disposed cantilever arms of different lateral compliance, a stylus of small tip radius adapted to engage said fine-groove records attached to the free end of the cantilever arm of lower compliance, a stylus of larger tip radius adapted to engage said coarser groove records attached to the free end of said cantilever arm of higher compliance, and a resilient damping member affixed to said arm in position to be engaged by the free end of the cantilever arm bearing one stylus when the other is in playing position to damp vibration of the stylus not in use.

9. In a phonograph reproducer arm assembly for alternatively reproducing fine-groove and coarser groove laterally-modulated records, a pickup cartridge rotatably mounted about an approximately vertical axis in said arm and adapted to engage a record surface, said pickup cartridge comprising a piezoelectric crystal secured in said cartridge at the top end thereof and having a stylus mounting at the bottom end thereof, a pair of approximately horizontally disposed cantilever arms extending in opposite directions from said mounting, a stylus of small tip radius adapted to engage said fine-groove records attached to the free end of one cantilever arm, the other cantilever arm having higher lateral compliance than said one arm and having attached at the free end thereof a stylus of larger tip radius adapted to engage said coarser groove records, and a resilient damping member affixed to said arm in position to be engaged by the free end of the cantilever arm bearing one stylus when the other is in playing position to damp vibration of the stylus not in use.

10. In a phonograph reproducer arm assembly for reproducing laterally-modulated fine-groove 33⅓ R. P. M. disk records having more than 200 grooves per inch and, alternatively, laterally-modulated coarser groove 78 R. P. M. disk records having of the order of 100 grooves per inch, the amplitude of excursion of the coarser groove being at a higher level than that of the fine groove, a pickup cartridge rotatably mounted about an approximately vertical axis in said arm and adapted to engage a record surface, said pickup cartridge comprising a piezoelectric crystal secured in said cartridge at the top end thereof and having a stylus mounting at the bottom end thereof, a pair of approximately horizontally disposed cantilever arms extending in opposite directions from said mounting, a stylus of small tip radius adapted to engage said fine-groove records attached to the free end of one cantilever arm, the other cantilever arm having higher lateral compliance than said one arm and having attached at the free end thereof a stylus of larger tip radius adapted to engage said coarser groove records, and a resilient damping member affixed to said arm in position to be engaged by one stylus when the other is in playing position to damp vibration of the stylus not in use.

11. In a phonograph reproducer arm assembly for reproducing laterally-modulated fine-groove 33⅓ R. P. M. disk records having more than 200 grooves per inch and, alternatively, laterally-modulated coarser groove 78 R. P. M., disk records having of the order of 100 grooves per inch, the amplitude of excursion of the coarser groove being at a higher level than that of the fine groove, a pickup cartridge rotatably mounted about an approximately vertical axis in said arm and adapted to engage a record surface, said pickup cartridge comprising a piezoelectric crystal secured in said cartridge at the top end thereof and having a stylus mounting at the bottom end thereof, a pair of approximately horizontally disposed cantilever arms extending in opposite directions from said mounting, a stylus of small tip radius adapted to engage said fine-groove records attached to the free end of one cantilever arm, the other cantilever arm having higher lateral compliance than said one arm and having attached at the free end thereof a stylus of larger tip radius adapted to engage said coarser groove records, resilient damping material attached to said cartridge above the stylus of larger tip radius in position to be engaged by the top of said stylus when reproducing a record, and a resilient damping member affixed to said arm in position to be engaged by one stylus when the other is in playing position to damp vibration of the stylus not in use.

12. Apparatus for alternatively reproducing fine-groove and coarser-groove laterally modulated phonograph disk records, the amplitude of excursion of the coarser groove being at a higher level than that of the fine groove, which comprises a pickup cartridge adapted for mounting in a pickup arm and having a transducer for converting mechanical movement into an electrical signal, a stylus mounting coupled to said transducer and having a pair of angularly spaced cantilever arms of different lateral compliance, a stylus of small tip radius adapted to engage said fine-groove records mounted on the cantilever arm of lower compliance, a stylus of larger tip radius adapted to engage said coarser groove records mounted on the cantilever arm of higher compliance, and rotatable mounting means permitting said stylus mounting to be rotated about an approximately vertical axis relative to said arm to allow either stylus to engage a record surface in playing position.

13. Apparatus for alternatively reproducing fine-groove and coarser-groove phonograph records which comprises a pickup cartridge adapted for mounting in a pickup arm and having a transducer for converting mechanical movement into an electrical signal, a stylus mounting coupled to said transducer and having a pair of angularly spaced cantilever arms, a pair of styli disposed at the free ends of said cantilever arms respectively, said styli having different tip radii for engagement with fine- and coarser-groove records respectively, rotatable mounting means permitting said stylus mounting to be rotated about an approximately vertical axis relative to said arm to allow either stylus to engage a record surface in playing position, and a resilient damping member fixed with respect to said cartridge and positioned to be engaged by the free end of the cantilever arm bearing one stylus when the other is in playing position.

References Cited in the file of this patent

UNITED STATES PATENTS

| Number | Name | Date |
|---|---|---|
| 630,521 | Schoenner | Aug. 8, 1899 |
| 1,570,297 | Dyer | Jan. 19, 1926 |
| 1,607,004 | Kramer | Nov. 16, 1926 |
| 1,822,932 | Loughridge | Sept. 15, 1931 |
| 1,992,892 | Thomas | Feb. 26, 1935 |
| 2,087,135 | Wielage | July 13, 1937 |
| 2,102,316 | Guedon | Dec. 14, 1937 |
| 2,113,401 | Goldsmith | Apr. 5, 1938 |
| 2,181,437 | Norton | Nov. 28, 1939 |
| 2,320,416 | Dally | June 1, 1943 |
| 2,456,388 | Cornwall | Dec. 14, 1948 |
| 2,476,685 | Rieber | July 19, 1949 |
| 2,526,188 | Andres | Oct. 17, 1950 |